US008216725B2

(12) United States Patent
Gao et al.

(10) Patent No.: US 8,216,725 B2
(45) Date of Patent: Jul. 10, 2012

(54) ELECTROLYTE FOR BATTERIES AND BATTERY PACKS

(75) Inventors: Yi Gao, Shenzhen (CN); JiangMin Zhu, Shenzhen (CN)

(73) Assignee: BYD Company Limited (CN)

( * ) Notice: Subject to any disclaimer, the term of this patent is extended or adjusted under 35 U.S.C. 154(b) by 727 days.

(21) Appl. No.: 12/352,981

(22) Filed: Jan. 13, 2009

(65) Prior Publication Data

US 2009/0191455 A1 Jul. 30, 2009

(30) Foreign Application Priority Data

Jan. 25, 2008 (CN) .......................... 2008 1 0006046

(51) Int. Cl.
*H01M 6/16* (2006.01)
(52) U.S. Cl. ........ 429/327; 429/326; 429/200; 429/199; 429/307; 429/341; 429/339; 429/340; 429/343; 252/62.2
(58) Field of Classification Search .................. 429/327, 429/326, 200, 199, 307, 341, 339, 340, 343; 252/62.2
See application file for complete search history.

(56) References Cited

U.S. PATENT DOCUMENTS

| | | | |
|---|---|---|---|
| 3,778,307 A | 12/1973 | Beer et al. | |
| 4,394,280 A | 7/1983 | von Alpen et al. | |
| 5,910,382 A | 6/1999 | Goodenough et al. | |
| 6,514,640 B1 | 2/2003 | Armand et al. | |
| 6,558,844 B2 | 5/2003 | Howard, Jr. et al. | |
| 6,645,452 B1 | 11/2003 | Barker et al. | |
| 6,702,961 B2 | 3/2004 | Barket et al. | |
| 6,835,500 B2 | 12/2004 | Masquelier et al. | |
| 6,960,331 B2 | 11/2005 | Barket et al. | |
| 6,964,830 B2 | 11/2005 | Takahashi | |
| 7,025,907 B2 | 4/2006 | Kahzaki et al. | |
| 7,172,834 B1 | 2/2007 | Jow et al. | |
| 7,189,475 B2 | 3/2007 | Sasaki et al. | |
| 7,255,965 B2 | 8/2007 | Xu et al. | |
| 7,261,979 B2 | 8/2007 | Gozdz et al. | |
| 7,338,734 B2 | 3/2008 | Chiang et al. | |
| 7,722,848 B2 | 5/2010 | Dai et al. | |
| 7,927,747 B2 * | 4/2011 | Lee et al. ....................... 429/327 |
| 2002/0047112 A1 | 4/2002 | Hosoya et al. | |
| 2002/0102459 A1 | 8/2002 | Hosoya et al. | |
| 2003/0064287 A1 | 4/2003 | Masquelier et al. | |
| 2003/0215714 A1 | 11/2003 | Barker et al. | |
| 2004/0151649 A1 | 8/2004 | Hemmer et al. | |
| 2005/0233220 A1 | 10/2005 | Gozdz et al. | |
| 2006/0083990 A1 | 4/2006 | Adamson et al. | |
| 2006/0236528 A1 | 10/2006 | Xu et al. | |
| 2007/0160752 A1 | 7/2007 | Mao | |
| 2007/0166609 A1 | 7/2007 | Lee et al. | |
| 2007/0178370 A1 | 8/2007 | Amine et al. | |
| 2007/0184352 A1 | 8/2007 | Donoue et al. | |
| 2007/0207080 A1 | 9/2007 | Yang | |
| 2007/0212606 A1 | 9/2007 | Chang | |
| 2009/0081102 A1 | 3/2009 | Dai | |
| 2009/0106970 A1 | 4/2009 | Fan | |
| 2009/0148765 A1 | 6/2009 | Cao et al. | |
| 2009/0169984 A1 | 7/2009 | Liang et al. | |
| 2009/0217512 A1 | 9/2009 | Tian et al. | |
| 2009/0217513 A1 | 9/2009 | Xi et al. | |
| 2009/0220856 A1 | 9/2009 | Tian et al. | |
| 2009/0220858 A1 | 9/2009 | Cheng | |
| 2009/0220860 A1 | 9/2009 | Xi et al. | |
| 2009/0302283 A1 | 12/2009 | Xia et al. | |
| 2010/0028771 A1 | 2/2010 | Zhou et al. | |
| 2010/0059706 A1 | 3/2010 | Dai et al. | |
| 2010/0062339 A1 | 3/2010 | Pan et al. | |

FOREIGN PATENT DOCUMENTS

| | | |
|---|---|---|
| CN | 1259773 | 7/2000 |
| CN | 1401559 | 3/2003 |
| CN | 1410349 | 4/2003 |
| CN | 1424980 | 6/2003 |
| CN | 1559889 | 1/2005 |
| CN | 1641912 | 7/2005 |
| CN | 1648036 | 8/2005 |
| CN | 1677718 | 10/2005 |
| CN | 1762798 | 4/2006 |
| CN | 1773754 | 5/2006 |
| CN | 1775665 | 5/2006 |
| CN | 1797823 | 7/2006 |
| CN | 1964125 | 5/2007 |
| CN | 1986395 | 6/2007 |
| CN | 1989649 | 6/2007 |
| CN | 101047268 | 10/2007 |
| CN | 101087021 | 12/2007 |
| CN | 101106189 | 1/2008 |
| CN | 101128950 | 2/2008 |
| CN | 101207197 | 6/2008 |
| CN | 101209827 | 7/2008 |
| CN | 101212048 | 7/2008 |
| CN | 101399343 | 4/2009 |

(Continued)

OTHER PUBLICATIONS

Related U.S. Appl. No. 12/035,978, entitled "Lithium Iron Phosphate Cathode Material," Final Office Action (mailed Dec. 7, 2009).
European Search Report for EP09400001 (mailed Apr. 14, 2009).
Related U.S. Appl. No. 12/127,431, entitled "Lithium Iron-Phosphate Cathode Material," Non-Final Office Action (mailed Oct. 20, 2009).
Hu, Huan-yu et al., "Influenece of the Mg-substitution on electrochemical performances of LiFePO4," China Academic Journal Electronic Publishing House, pp. 18-20, vol. 30, No. 1, 2006.
International Patent Application Serial No. PCT/CN08/70391, International Search Report and Written Opinion (mailed Jul. 17, 2008).
Pei, Su-hua et al., "Sensitivity of $TiO^2$: NB2O5 composite crystalliod to trimethylamine", Journal of Functional Materials and Devices, vol. 12, No. 3, Jun. 2006.

(Continued)

*Primary Examiner* — Laura Weiner

(74) *Attorney, Agent, or Firm* — Greenberg Traurig, LLP

(57) ABSTRACT

Electrolyte for lithium secondary batteries and battery packs includes a lithium salt, a non-aqueous solvent, and an additive. The additive includes two or more members selected from the group consisting of substances A, B and C, wherein A includes one or more fused ring compounds and fused heterocyclic compounds, B includes an alkoxy aromatic compound, and C includes halogenated borane-based salt.

16 Claims, No Drawings

FOREIGN PATENT DOCUMENTS

| | | |
|---|---|---|
| CN | 101420048 | 4/2009 |
| CN | 101453019 | 6/2009 |
| CN | 101471432 | 7/2009 |
| CN | 101478041 | 7/2009 |
| CN | 101478042 | 7/2009 |
| EP | 1553647 | 7/2005 |
| EP | 1855334 | 11/2007 |
| JP | 2000-156243 * | 6/2000 |
| WO | 9740541 | 10/1997 |
| WO | 2005076936 | 8/2005 |
| WO | 2006066470 | 6/2006 |
| WO | 2006112674 | 10/2006 |
| WO | 2008109734 | 9/2008 |

OTHER PUBLICATIONS

Related U.S. Appl. No. 12/035,978, entitled "Lithium Iron Phosphate Cathode Material ," Non-Final Office Action (mailed Apr. 27, 2009).

Related U.S. Appl. No. 12/035,978, entitled "Lithium Iron Phosphate Cathode Material ," Non-Final Office Action (mailed Oct. 2, 2008).

Related U.S. Appl. No. 12/035,978, entitled "Lithium Iron Phosphate Cathode Material," Final Office Action (mailed Jan. 9, 2009).

Related U.S. Appl. No. 12/127,431, entitled "Lithium Iron-Phosphate Cathode Material," Final Office Action (mailed Jun. 26, 2009).

Related U.S. Appl. No. 12/127,431, entitled "Lithium Iron-Phosphate Cathode Material," Non-Final Office Action (mailed Jan. 30, 2009).

Yun et al., "Synthesis and electrochemcial properties of olivine-type LiFe PO4/C composite cathode material prepared from a poly(vinyl alcohol)-containg precursor." Journal of Power Sources vol. 160, issue 2, Oct. 2006, pp. 1361-1368 (Available online May 9, 2006).

USPTO Transaction History of related U.S. Appl. No. 12/035,978, filed Feb. 22, 2008, entitled "Lithium Iron Phosphate Cathode Material."

USPTO Transaction History of related U.S. Appl. No. 12/040,773, filed Feb. 29, 2008, entitled "Composite Compound with Mixed Crystalline Structure."

USPTO Transaction History of related U.S. Appl. No. 12/053,308, filed Mar. 21, 2008, entitled "Cathode Materials for Lithium Batteries."

USPTO Transaction History of related U.S. Appl. No. 12/127,431, filed May 27, 2008, entitled "Lithium Iron Phosphate Cathode Material."

USPTO Transaction History of related U.S. Appl. No. 12/198,087, filed Aug. 25, 2008, entitled "Lithium-Ion Rechargeable Battery Preparation."

USPTO Transaction History of related U.S. Appl. No. 12/254,537, filed Oct. 20, 2008, entitled "Lithium Iron(II) Phosphate Cathode Active Material."

USPTO Transaction History of related U.S. Appl. No. 12/273,649, filed Nov. 19, 2008, entitled "Composite Separator Films for Lithium-Ion Batteries."

USPTO Transaction History of related U.S. Appl. No. 12/316,165, filed Dec. 9, 2008, entitled "Composite Compound with Mixed Crystalline Structure."

USPTO Transaction History of related U.S. Appl. No. 12/316,173, filed Dec. 9, 2008, entitled "Composite Compound with Mixed Crystalline Structure."

USPTO Transaction History of related U.S. Appl. No. 12/316,180, filed Dec. 9, 2008, entitled "Composite Compound with Mixed Crystalline Structure."

USPTO Transaction History of related U.S. Appl. No. 12/316,234, filed Dec. 9, 2008, entitled "Composite Compound with Mixed Crystalline Structure."

USPTO Transaction History of related U.S. Appl. No. 12/436,347, filed May 6, 2009, entitled "Transition Metal Hydroxide and Oxide, Method of Producing the Same, and Cathode Material Containing the Same."

USPTO Transaction History of related U.S. Appl. No. 12/482,690, filed Jun. 11, 2009, entitled "Electrolyte for Lithium Batteries."

* cited by examiner

ELECTROLYTE FOR BATTERIES AND BATTERY PACKS

CROSS-REFERENCE TO RELATED APPLICATION

This application claims priority to Chinese Patent Application No. 200810006046.9, filed Jan. 25, 2008.

FIELD OF THE INVENTION

The embodiments of the present invention relate to lithium batteries, more specifically, to an electrolyte for lithium batteries and battery packs.

BACKGROUND

Because of its high voltage and high energy density, lithium secondary batteries are widely used in various mobile electronic devices and electric tools. However, with rapidly demanding performance of portable devices on the rise, lithium-ion batteries having higher capacity, longer life and higher energy density remains challenging. Furthermore, the increasing demand places additional requirement on safety, security and performance of these batteries.

SUMMARY

Accordingly, one embodiment discloses an electrolyte for lithium-ion batteries, the electrolyte comprising: a lithium salt; a non-aqueous solvent; and an additive, the additive comprising two or more members selected from the group consisting of substances A, B and C, wherein: substance A includes one or more fused ring compounds and fused heterocyclic compounds; substance B includes an alkoxy aromatic compound; and substance C includes halogenated borane-based salt. In another embodiment, the additive includes two members selected from the group consisting of substances A, B and C, wherein weight ratio of the two members can range from about 1:15 to 15:1. In yet another embodiment, the additive also includes three members selected from each of substances A, B and C, wherein weight ratio of substances A:B:C can range from about 1:0.05:0.05 to about 1:15:15. In one example, the weight ratio of the fused ring compounds to the fused heterocyclic compounds of substance A can range from about 1:5 to about 10:1.

In one embodiment, the fused ring compounds of substance A include one or more members selected from chemical structures (1) and (2), and the fused heterocyclic compounds of substance A include one or more members selected from chemical structures (3), (4) and (5); and

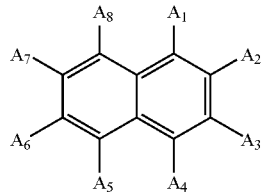
(1)

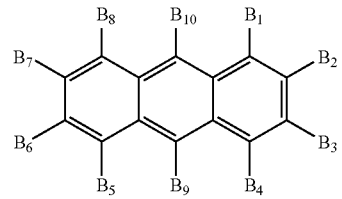
(2)

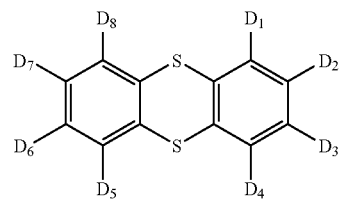
(3)

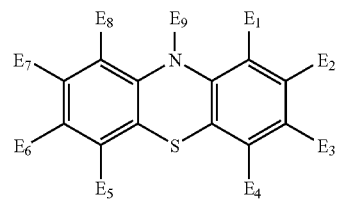
(4)

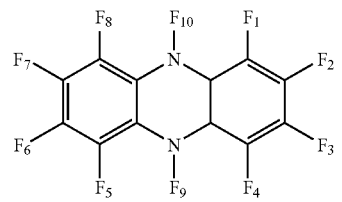
(5)

wherein $A_1$-$A_8$, $B_1$-$B_{10}$, $D_1$-$D_8$, $E_1$-$E_9$ and $F_1$-$F_{10}$ can be selected from members consisting of hydrogen, halogens, alkyl groups having 1-20 carbons and acyl groups having 1-15 carbons.

In another embodiment, the alkoxy aromatic compounds of substance B include one or more members selected from chemical structures (6), (7) and (8); and

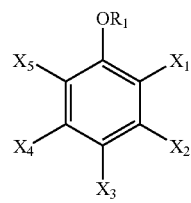
(6)

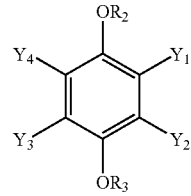
(7)

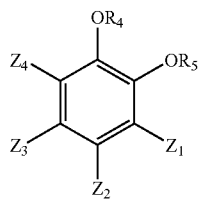

(8)

wherein $R_1$-$R_5$ can be selected from members consisting of alkyl groups having 1-15 carbons, and $X_1$-$X_5$, $Y_1$-$Y_4$ and $Z_1$-$Z_4$ can be selected from members consisting of hydrogen, halogens, and alkyl groups having 1-15 carbons.

In yet another embodiment, the halogenated borane-based salt includes $Li_2B_{12}F_mH_{12-m}$, wherein $12 \geqq m \geqq 1$. In one example, the amount of additive can be about 1 to 20% of the electrolyte by weight. In another example, the lithium salt includes one or more members of lithium hexafluorophosphate, lithium tetrafluoroborate, lithium hexafluoroarsenate, lithium perchlorate, lithium trifluoromethylsulfonate, lithium perfluorobutane sulfonate, lithium aluminate, lithium chloroaluminate, fluorinated lithium sulfonimide, lithium chloride and lithium iodide. In yet another example, the non-aqueous solvent include one or more members of gamma-butyrolactone, methyl ethyl carbonate, methyl propyl carbonate, dipropyl carbonate, anhydride, N-methyl pyrrolidone, N-dimethylformamide, N-methyl acetamide, acetonitrile, N,N-dimethylformamide, sulfolane, dimethyl sulfoxide, diethyl sulfite, and other unsaturated cyclic organic esters having fluorine and sulfur.

In another embodiment, an electrolyte for lithium-ion batteries, the electrolyte comprising: a lithium salt; a non-aqueous solvent; and an additive, the additive comprising two or more members selected from the group consisting of substances A, B and C, wherein: substance A includes one or more fused ring compounds and fused heterocyclic compounds, wherein the fused ring compounds include one or more members selected from chemical structures (1) and (2) and the fused heterocyclic compounds include one or more members selected from chemical structures (3), (4) and (5); and

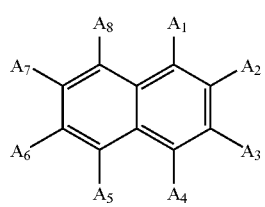

(1)

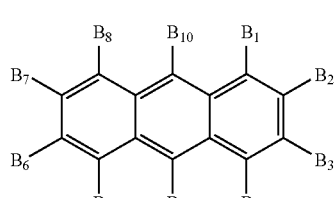

(2)

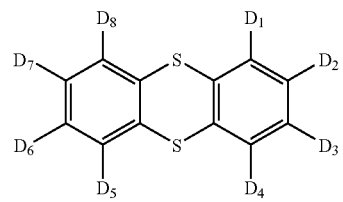

(3)

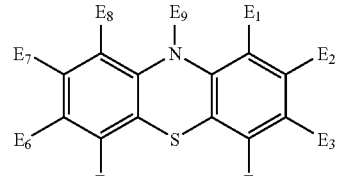

(4)

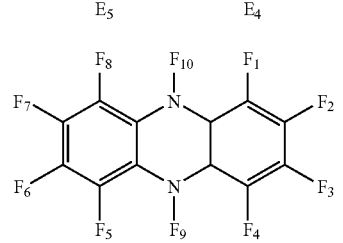

(5)

wherein $A_1$-$A_8$, $B_1$-$B_{10}$, $D_1$-$D_8$, $E_1$-$E_9$ and $F_1$-$F_{10}$ can be selected from members consisting of hydrogen, halogens, alkyl groups having 1-20 carbons and acyl groups having 1-15 carbons; substance B includes an alkoxy aromatic compound, wherein the alkoxy aromatic compound includes one or more members selected from chemical structures (6), (7) and (8); and

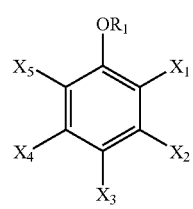

(6)

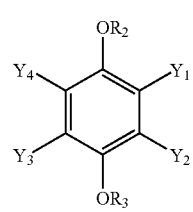

(7)

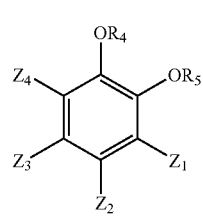

(8)

wherein $R_1$-$R_5$ can be selected from members consisting of alkyl groups having 1-15 carbons, and $X_1$-$X_5$, $Y_1$-$Y_4$ and $Z_1$-$Z_4$ can be selected from members consisting of hydrogen, halogens, and alkyl groups having 1-15 carbons; and substance C includes halogenated borane-based salt, wherein the borane-based salt includes $Li_2B_{12}F_mH_{12-m}$, wherein $12 \geq m \geq 1$.

In one embodiment, the additive includes two members selected from the group consisting of substances A, B and C, wherein weight ratio of the two members can range from about 1:15 to 15:1. In another embodiment, the additive includes three members selected from each of substances A, B and C, wherein weight ratio of substances A:B:C can range from about 1:0.05:0.05 to about 1:15:15. In yet another embodiment, the weight ratio of the fused ring compounds to the fused heterocyclic compounds of substance A can range from about 1:5 to about 10:1. In one instance, the amount of additive can be about 1 to 20% of the electrolyte by weight.

In another embodiment, an electrolyte for lithium-ion batteries, the electrolyte comprising: a lithium salt selected from one or more members consisting of lithium hexafluorophosphate, lithium tetrafluoroborate, lithium hexafluoroarsenate, lithium perchlorate, lithium trifluoromethylsulfonate, lithium perfluorobutane sulfonate, lithium aluminate, lithium chloroaluminate, fluorinated lithium sulfonimide, lithium chloride and lithium iodide; a non-aqueous solvent selected from one or more members consisting of gamma-butyrolactone, methyl ethyl carbonate, methyl propyl carbonate, dipropyl carbonate, anhydride, N-methyl pyrrolidone, N-dimethylformamide, N-methyl acetamide, acetonitrile, N,N-dimethylformamide, sulfolane, dimethyl sulfoxide, diethyl sulfite, and other unsaturated cyclic organic esters having fluorine and sulfur; and an additive being about 1 to 20% of the electrolyte by weight, the additive comprising two or more members selected from the group consisting of substances A, B and C, wherein: substance A includes one or more fused ring compounds and fused heterocyclic compounds, wherein the fused ring compounds include one or more members selected from chemical structures (1) and (2) and the fused heterocyclic compounds include one or more members selected from chemical structures (3), (4) and (5); and

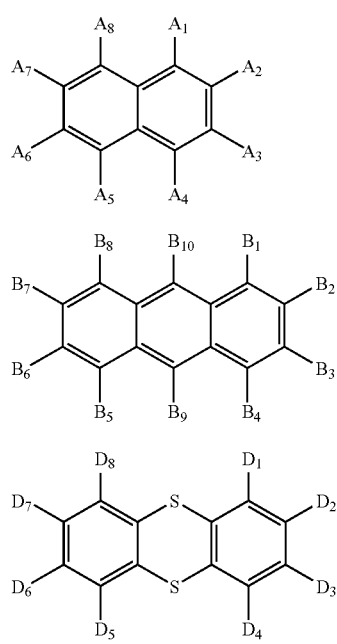

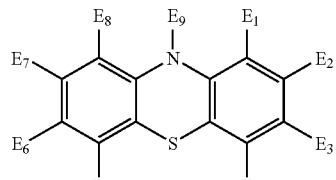

(4)

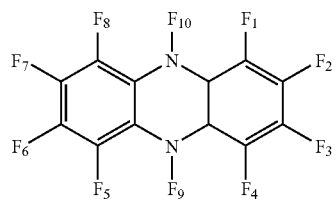

(5)

wherein $A_1$-$A_8$, $B_1$-$B_{10}$, $D_1$-$D_8$, $E_1$-$E_9$ and $F_1$-$F_{10}$ can be selected from members consisting of hydrogen, halogens, alkyl groups having 1-20 carbons and acyl groups having 1-15 carbons; substance B includes an alkoxy aromatic compound, wherein the alkoxy aromatic compound includes one or more members selected from chemical structures (6), (7) and (8); and

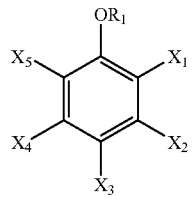

(6)

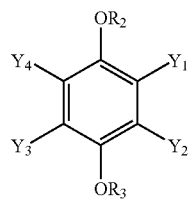

(7)

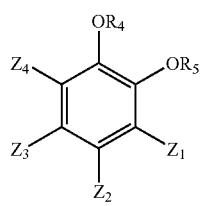

(8)

wherein $R_1$-$R_5$ can be selected from members consisting of alkyl groups having 1-15 carbons, and $X_1$-$X_5$, $Y_1$-$Y_4$ and $Z_1$-$Z_4$ can be selected from members consisting of hydrogen, halogens, and alkyl groups having 1-15 carbons; and substance C includes halogenated borane-based salt, wherein the borane-based salt includes $Li_2B_{12}F_mH_{12-m}$, wherein $12 \geq m \geq 1$.

In other embodiments, lithium-ion batteries and battery packs may be produced using the electrolyte as described in the previously disclosed embodiments.

Other variations, embodiments and features of the present invention will become evident from the following detailed description, drawings and claims.

DETAILED DESCRIPTION

It will be appreciated by those of ordinary skill in the art that the invention can be embodied in other specific forms without departing from the spirit or essential character thereof. The presently disclosed embodiments are therefore considered in all respects to be illustrative and not restrictive.

A first embodiment of the present invention discloses an electrolyte for lithium-ion batteries, the electrolyte consisting of a lithium salt, a non-aqueous solvent and an additive. In this embodiment, the additive includes two or more members selected from substances A, B and C, wherein substance A includes one or more fused ring compounds and fused heterocyclic compounds, substance B includes alkoxy aromatic compounds, and substance C includes halogenated borane-based salt.

In one embodiment, substance A includes one or more fused ring compounds and fused heterocyclic compounds, the fused ring compounds being one or more members selected from chemical structures (1) and (2), and the fused heterocyclic compounds being one or more members selected from chemical structures (3), (4) and (5).

In these embodiments, $A_1$-$A_8$, $B_1$-$B_{10}$, $D_1$-$D_8$, $E_1$-$E_9$ and $F_1$-$F_{10}$ can be selected from members consisting of hydrogen, halogens (e.g., fluorine, chlorine and bromine), alkyl groups having 1-20 carbons and acyl groups having 1-15 carbons.

In one embodiment, substance A includes a mixture of one or more fused ring compounds (1) or (2), and one or more fused heterocyclic compounds (3), (4) or (5), wherein the ratio of the fused ring to heterocyclic compounds by weight can range from about 1:5 to about 10:1. In other embodiments, the ratio of fused ring compound to fused heterocyclic compound can vary from about 1:1 to about 5:1 by weight. The mixing of the fused ring compounds and the fused heterocyclic compounds increases the solubility of substance A and can facilitate dissolution of substance C, which has enhanced voltage limiting properties but lowered solubility within the electrolyte. The addition makes minimal alterations to the ion conductivity of the electrolyte allowing the battery to exhibit enhanced characteristics including low temperature operation, improved storage and cycle time, and voltage uniformity for single batteries and battery packs.

Substance B includes one or more alkoxy aromatic compounds selected from chemical structures (6), (7) and (8).

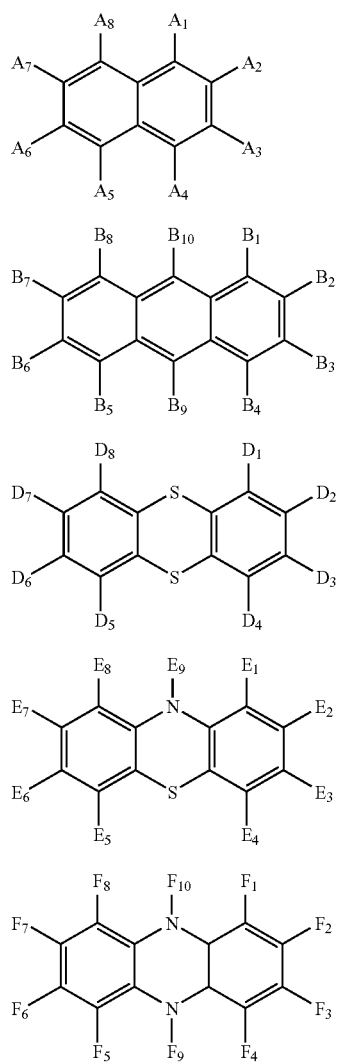

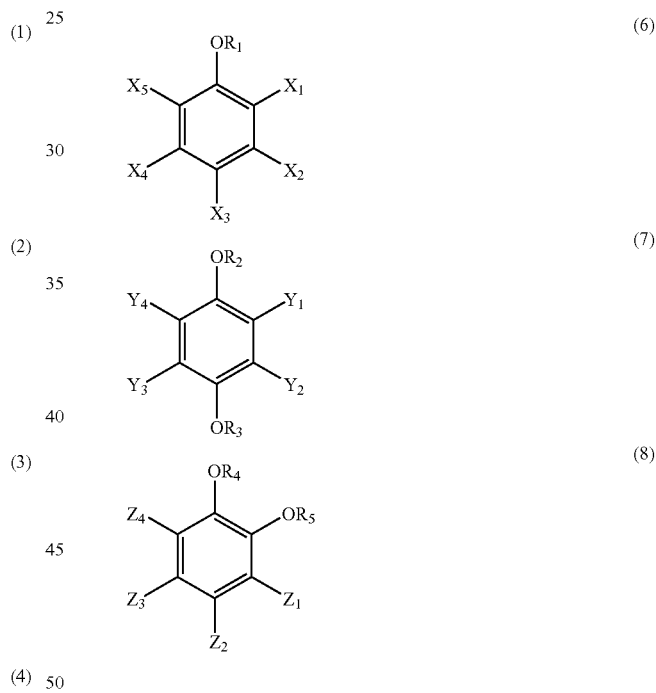

In these embodiments, $R_1$-$R_5$ can be selected from members including alkyl groups having 1-15 carbons, and $X_1$-$X_5$, $Y_1$-$Y_4$ and $Z_1$-$Z_4$ can be selected from members including hydrogen, halogens (e.g., fluorine, chlorine and bromine) and alkyl groups having 1-15 carbons.

Substance C includes one or more halogenated borane-based salt including without limitation $Li_2B_{12}F_mH_{12-m}$, wherein $12 \geq m \geq 1$.

In one instance, the amount of additive can be about 1 to 20% of the electrolyte by weight. In other instances, the amount of additive can be about 1 to 10%.

When the additive includes any two of substances A, B or C, the ratio between them can vary from about 1:15 to about 15:1 by weight. In other embodiments, the ratio can vary from about 1:6 to about 6:1 by weight. When the additive includes each member of substances A, B and C, the ratio of A:B:C by weight can vary from about 1:0.05:0.05 to about 1:15:15. In other embodiments, the ratio of A:B:C by weight can vary from about 1:0.3:0.3 to about 1:3:3.

The lithium salt for the electrolyte can be various lithium salts in the art including one or more members of lithium hexafluorophosphate, lithium tetrafluoroborate, lithium hexafluoroarsenate, lithium perchlorate, lithium trifluoromethylsulfonate, lithium perfluorobutane sulfonate, lithium aluminate, lithium chloroaluminate, fluorinated lithium sulfonimide, lithium chloride and lithium iodide. The concentration of the lithium salt in the electrolyte can be from about 0.3 to 4.0 mol/L. In other instances, the concentration of the lithium salt in the electrolyte can be from about 0.5 to 2.0 mol/L.

The non-aqueous solvent for the electrolyte can be various non-aqueous solvents in the art including one or more members of gamma-butyrolactone, methyl ethyl carbonate, methyl propyl carbonate, dipropyl carbonate, anhydride, N-methyl pyrrolidone, N-dimethylformamide, N-methyl acetamide, acetonitrile, N,N-dimethylformamide, sulfolane, dimethyl sulfoxide, diethyl sulfite, and other unsaturated cyclic organic esters having fluorine and sulfur.

The presently disclosed electrolyte can be prepared by methods of preparing electrolyte for lithium-ion batteries. For example, the lithium salt, organic solvent and additive can be mixed and prepared using the parameters described below.

A lithium secondary battery includes a battery core and an electrolyte, wherein the electrolyte includes the electrolyte embodiments disclosed above for lithium-ion batteries. There are no limitations to other parts and structures of the lithium-ion battery. In one instance, the battery core includes a cathode, anode and separator between the cathode and anode. The separator, situated between the cathode and anode, has the ability to insulate and maintain liquids within, and can be tightly sealed within the battery core together with the cathode and anode. The types of separator include modified polyethylene fiber, modified polypropylene fiber, ultra-thin glass fiber, vinyl fiber or nylon fiber with wetted polyolefin microporous membrane formed by welding or bonding of composite membrane.

In one example, the cathode includes a current collector and cathode material coated onto or filled within the current collector. The types of current collector include without limitation aluminum foil, copper foil or steel strip with nickel plating. The types of cathode material include without limitation $LiFePO_4$, $Li_xNi_{1-y}CoO_2$ ($0.9 < x < 1.1$ and $0 \leq y \leq 1.0$), $Li_mMn_{2-n}B_nO_2$ ($0.9 \leq m \leq 1.1$, $0 \leq n \leq 1.0$, and B being transition metals), $Li_{1+a}M_bMn_{2-b}O_4$ (wherein $-0.1 \leq a \leq 0.2$, $0 \leq b \leq 1.0$, and M being one or more elements select from Li B, Mg, Al, Ti, Cr, Co, Fe, Ni, Cu, Zn, Ga, Yt, F, I, S).

The cathode material further includes an adhesive, the adhesive being a mixture of hydrophilic and hydrophobic components. The ratio of hydrophilic component to hydrophobic component can be about 0.3 to 1 but need not be limited. The adhesive can come in aqueous, emulsion or solid forms. The concentration of the hydrophilic adhesive solution and the hydrophobic adhesive emulsion can be adjusted accordingly for viscosity and preparation of the anode and cathode slurry coating. In one example, the concentration of the hydrophilic adhesive solution can be about 0.5 to 4.0% by weight while the concentration of the hydrophobic adhesive emulsion can be about 10 to 80% by weight. The hydrophobic adhesive includes polytetrafluoroethylene (PTFE), styrene-butadiene rubber (SBR), or mixture of PTFE and SBR while the hydrophilic adhesive includes hydroxypropyl methylcellulose (HPMC), sodium carboxymethylcellulose, hydroxyethylcellulose, polyvinyl alcohol (PVA), or mixtures thereof. The amount of adhesives within the cathode material can be about 0.01 to 8% by weight. In other embodiments, the amount of adhesives can be about 1 to 5% by weight.

The cathode material as described above further includes a conductive agent for enhancing the conductivity of the electrode and reducing the internal resistance of the battery. In one example, the conductive agent can be about 0 to 15% by weight of the cathode material. In other examples, the conductive agent can be about 0 to 10% by weight. The conductive agent includes one or more members selected from the group consisting of conductive carbon black, acetylene black, nickel powder, copper powder and conductive graphite.

In one example, the anode includes a conductive base and an anode active material coated onto or filled within the conductive base. The types of conductive base include without limitation aluminum foil, copper foil, steel strip with nickel plating and steel strip with punched holes. The types of anode active material include without limitation natural graphite, artificial graphite, petroleum coke, organic cracked carbon, mesocarbon microspheres, carbon fiber, tin alloy and silicon alloy. The anode active material further includes an adhesive being selected from one or more members of polyvinyl alcohol, polytetrafluoroethylene (PTFE), hydroxymethyl cellulose (CMC) and styrene-butadiene rubber (SBR). In one instance, the amount of adhesive can be about 0.5 to 8% by weight of the anode active material. In other instances, the amount of adhesive can be about 2 to 5%. In one embodiment, lithium foil can function as the anode.

The solvent for preparing the cathode and anode slurry include one or more members of N-methyl pyrrolidone (NMP), dimethylformamide (DMF), diethylformamide (DEF), dimethyl sulfoxide (DMSO), tetrahydrofuran (THF), water, alcohol and mixtures thereof. The amount of solvent to be used can be enough for coating the slurry onto the base and collector. In other examples, the amount of solvent can be about 100 to 150% by weight of the cathode or anode active materials.

The method of preparing the lithium secondary battery includes situating the separator between the cathode and anode to form an electrode group, which can be housed within the battery core. The presently disclosed embodiments of electrolyte can be injected within the battery core and sealed to form the lithium secondary battery. The method of preparing the cathode includes mixing coating slurry of cathode active material, adhesive and conductive agent on the current collector, drying, pressing or rolling, and slicing to form the cathode. In one instance, the drying process can be at temperatures of about 50 to 160° C. In other instances, the drying process can be at temperatures of about 80 to 150° C. The method of preparing the anode can be similar in all respect to that of preparing the cathode with the exception that anode active material and adhesive are utilized instead.

Presently disclosed embodiments further include a battery pack having a plurality of single batteries wherein each battery includes a lithium secondary battery incorporating the previously disclosed electrolyte embodiments. The single batteries can be connected in series or in parallel with various methods of coupling between the electrode terminals of the batteries in forming the serial or parallel connections. In one example, the single batteries can be coupled together by joining the electrode terminals of the batteries. In one instance, the electrode terminals can be soldered or welded together. After coupling the single batteries and forming a battery pack, the battery pack can be securely fastened and heat dissipation structures can be disposed between the single batteries. The single batteries can be further secured to minimize movement.

The following provides additional details of the electrolyte embodiments of the present invention.

EXAMPLE 1

At room temperature and within a glove box, ethylene carbonate, dimethyl carbonate and ethyl methyl carbonate are mixed in a ratio of 1:1:1. $LiPF_6$ can subsequently be added to the mixture to provide a solution with a concentration of 1 mol/L. An additive, in an amount of about 5% by weight of the total final electrolyte product, can be added to the solution. The composition of the additive includes naphthalene, thianthrene and 3-chloro anisole (Sigma-Aldrich Co.) at a weight ratio of 2:1:1. The electrolyte can be labeled as A1.

EXAMPLE 2

Substantially similar in all respect to that of Example 1 except the additive can be about 2% by weight of the total final electrolyte product and its composition includes thianthrene and 4-Br-1,2-dimethoxybenzene (Sigma-Aldrich Co.) at a weight ratio of 2:1. The electrolyte can be labeled as A2.

EXAMPLE 3

Substantially similar in all respect to that of Example 1 except the additive can be about 10% by weight of the total final electrolyte product and its composition includes 3-chloro anisole and $Li_2B_{12}FH_{11}$ (Sigma-Aldrich Co.) at a weight ratio of 1:1. The electrolyte can be labeled as A3.

EXAMPLE 4

Substantially similar in all respect to that of Example 1 except the additive can be about 1% by weight of the total final electrolyte product and its composition includes naphthalene, thianthrene and $Li_2B_{12}F_3H_9$ (Sigma-Aldrich Co.) at a weight ratio of 1:1:4. The electrolyte can be labeled as A4.

EXAMPLE 5

Substantially similar in all respect to that of Example 1 except the composition of the additive includes anthracene, N,N'-dimethyidihydrophenazine (Sigma-Aldrich Co.), 4-Cl-1,2-dimethoxybenzene (Sigma-Aldrich Co.) and $Li_2B_{12}F_2H_{10}$ (Sigma-Aldrich Co.) at a weight ratio of 1:0.2:3:1. The electrolyte can be labeled as A5.

EXAMPLE 6

Substantially similar in all respect to that of Example 1 except the additive can be about 2% by weight of the total final electrolyte product and its composition includes thianthrene, 2,5-butyl-1,4-dimethoxybenzene (Sigma-Aldrich Co.) and $Li_2B_{12}F_{10}H_2$ (Sigma-Aldrich Co.) at a weight ratio of 2:1:1. The electrolyte can be labeled as A6.

EXAMPLE 7

Substantially similar in all respect to that of Example 1 except the additive can be about 5% by weight of the total final electrolyte product and its composition includes 2,7-acetyl-thianthrene (Sigma-Aldrich Co.), 3-chloro anisole and $Li_2B_{12}F_6H_6$ (Sigma-Aldrich Co.) at a weight ratio of 1:1:1. The electrolyte can be labeled as A7.

Reference 1

At room temperature and within a glove box, ethylene carbonate, dimethyl carbonate and ethyl methyl carbonate are mixed in a ratio of 1:1:1. $LiPF_6$ can subsequently be added to the mixture to provide a solution with a concentration of 1 mol/L. The electrolyte can be labeled as C1.

Reference 2

At room temperature and within a glove box, ethylene carbonate, dimethyl carbonate and ethyl methyl carbonate are mixed in a ratio of 1:1:1. $LiPF_6$ can subsequently be added to the mixture to provide a solution with a concentration of 1 mol/L. An additive, in an amount of about 3% by weight of the total final electrolyte product, can be added to the solution. The composition of the additive includes vinylene carbonate, biphenyl, cyclohexylbenzene, 1,3-propanesultone and vinylsulfurylbenzene at a weight ratio of 1:1:2:1:1. The electrolyte can be labeled as C2.

The following describes methods of preparing lithium batteries incorporating the electrolyte embodiments of the present invention.

Preparation of the Cathode

Add 100% by weight of $LiFePO_4$ (FMC Corp.), 3.5% by weight of polyvinylidene fluoride adhesive (Atofina Chemical, Inc., 761 # PVDF), and 4.5% by weight of acetylene black to 70% by weight of NMP, mix and churn in vacuum mixer to form cathode slurry. Apply cathode slurry coating onto 20 micron thick aluminum foil, dry for 1 hour at a temperature of about 130° C., and press to provide the cathode having a thickness of about 165 microns.

Preparation of the Anode

Add 100% by weight of black lead (Sodiff Advanced Materials Co., LTD, DAG84), 1% by weight of carbon black, 3.5% by weight of styrene-butadiene rubber (SBR) adhesive latex (Nantong Shenhua Chemical Industry Co., LTD., TAIPOL 1500E), and 1% by weight of carboxymethyl cellulose (Jinangmen Quantum High-Tech Biological Co., LTD, CMC1500) to 120% by weight of deionized water, mix and churn in a vacuum mixer to form anode slurry. Apply anode slurry coating onto 12 micron thick copper foil, dry for 1 hour at a temperature of about 140° C., and press to provide the anode having a thickness of about 105 microns Preparation of the Batteries Take the cathode and anode from above, together with separator of about 20 micron thick, are wound into thick a square-shaped lithium-ion battery core. The electrolyte (about 3.8 g) from each of Examples 1-7 are subsequently injected into the battery core and air-sealed to provide seven 053450A type lithium-ion batteries labeled B1-B7. Likewise, the electrolyte from each of References 1-2 are subsequently injected into the battery core and air-sealed to provide two 053450A type lithium-ion batteries labeled D1-D2.

In other embodiments, three batteries from each of B1-B7 can be connected in series to provide battery packs labeled E1-E7. For example, three B1 batteries can be coupled in series to provide battery pack E1, three B2 batteries can be coupled in series to provide battery pack E2, three B3 batteries can be coupled in series to provide battery pack E3, and so forth. Likewise, three batteries from each of D1-D2 can be connected in series to provide battery packs F1 and F2, respectively.

Battery Testing

1. Overcharging Performance Testing

At room temperature, batteries B1-B7 and D1-D2 are overcharged to 0.075 A and 4.6 V. The physical appearance and duration of the battery's ability to maintain the overcharge are shown in Table 1.

2. Capacity Retention Performance Testing

At room temperature, batteries B1-B7 and D1-D2 are charged at 0.75 A constant current to 3.8 V, at constant voltage to cut-off current 0.01 A, and discharged at 0.75 A constant current to 2.0 V to produce an initial capacity. The thickness of the batteries are also noted. The charging/discharging cycle can be repeated 500 times to provide the battery's capacity after 500 cycles. Each battery's capacity retention rate after 500 cycles and thickness changes are shown in Table 1. The capacity retention rate can be calculated using the following equation:

Capacity retention rate=(capacity after 500 cycles/
initial capacity)×100%.

TABLE 1

OVERCHARGING AND CYCLING PERFORMANCES
OF BATTERIES B1-B7 AND D1-D2.

| No. | Overcharge Time (hour) | State | Capacity Retention Rate after 500 Cycles (%) | Change in Thickness (mm) |
|---|---|---|---|---|
| B1 | 2.5 | Inflated | 98.5 | 0.02 |
| B2 | 2.5 | Inflated | 98.1 | 0.03 |
| B3 | 2.5 | Inflated | 98.4 | 0.03 |
| B4 | 2.5 | Inflated | 98.7 | 0.02 |
| B5 | 2.5 | Inflated | 98.7 | 0.02 |
| B6 | 2.5 | Inflated | 99.2 | 0.01 |
| B7 | 2.5 | Inflated | 99.6 | 0.01 |
| D1 | 0.5 | Exploded | 95.6 | 0.1 |
| D2 | 1.5 | Anti-Exploding Valve Activated | 92.1 | 0.7 |

3. Low Temperature Discharge Performance Testing

At room temperature, batteries B1-B7 and D1-D2 are charged at 0.75 A constant current to 3.8 V, at constant voltage to cut-off current 0.01 A, and discharged at 0.75 A constant current to 2.0 V to produce an initial capacity. The batteries are again charged at 0.75 A constant current to 3.8 V, and then at constant voltage to cut-off current 0.01 A. The batteries are maintained at −10° C. and −20° C. for 120 minutes, removed, and discharged again at 0.75 A constant current to 2.0 V. Each battery's capacity ratio at different temperatures and ending resistance value are shown in Table 2. The capacity ratio can be calculated using the following equation:

Capacity ratio=(discharge capacity/initial capacity)×
100%.

TABLE 2

LOW TEMPERATURE DISCHARGE PERFORMANCE
OF BATTERIES B1-B7 AND D1-D2.

| | −10° C. | | −20° C. | |
|---|---|---|---|---|
| No. | −10° C./25° C. Capacity Ratio (%) | Ending resistance (mΩ) | −20° C./25° C. Capacity Ratio (%) | Final resistance (mΩ) |
| B1 | 52.9 | 45.0 | 42.5 | 54.9 |
| B2 | 52.1 | 45.8 | 41.9 | 55.7 |
| B3 | 52.4 | 45.2 | 41.8 | 55.7 |
| B4 | 52.7 | 44.9 | 42.1 | 54.5 |
| B5 | 53.0 | 44.7 | 44.3 | 54.0 |
| B6 | 53.5 | 44.2 | 46.2 | 53.8 |
| B7 | 54.3 | 43.8 | 46.6 | 53.1 |
| D1 | 52.2 | 46.1 | 40.5 | 55.9 |
| D2 | 41.7 | 58.3 | 29.1 | 70.1 |

4. High Temperature Storage Performance Testing

At room temperature, batteries B1-B7 and D1-D2 are charged at 0.75 A constant current to 3.8 V, at constant voltage to cut-off current 0.01 A, and discharged at 0.75 A constant current to 2.0 V to produce an initial capacity. The thickness, resistance and voltage of the batteries are also noted. The batteries are again charged at 0.75 A constant current to 3.8 V, maintained at 85° C. for 48 hours, and discharged again at 0.75 A constant current to 2.0 V. The thickness, resistance and voltage of the batteries are again noted.

Results are shown in Table 3.

TABLE 3

HIGH TEMPERATURE STORAGE PERFORMANCE
OF BATTERIES B1-B7 AND D1-D2.

| No. | Capacity Retention (%) | Capacity Recovery (%) | Changes in Thickness (mm) | Changes in Resistance (%) | Voltage Drop (V) |
|---|---|---|---|---|---|
| B1 | 94.8 | 97.5 | 0.15 | 11.9 | 0.048 |
| B2 | 94.4 | 97.2 | 0.16 | 12.5 | 0.057 |
| B3 | 94.2 | 97.3 | 0.15 | 12.8 | 0.051 |
| B4 | 95.0 | 97.5 | 0.15 | 12.0 | 0.047 |
| B5 | 95.4 | 98.2 | 0.15 | 11.7 | 0.043 |
| B6 | 96.7 | 98.9 | 0.14 | 11.4 | 0.041 |
| B7 | 97.0 | 98.8 | 0.13 | 11.1 | 0.041 |
| D1 | 94.1 | 96.4 | 0.20 | 12.7 | 0.053 |
| D2 | 90.1 | 92.3 | 0.96 | 50.3 | 0.133 |

5. Battery Pack Capacity Retention Performance Testing

At room temperature, battery packs E1-E7 and F1-F2 are charged at 0.75 A constant current to 11.4 V, at constant voltage to cut-off current 0.01 A, and discharged at 0.75 A constant current to 6.0 V to produce an initial capacity for the entire battery pack. The initial capacity for each single battery within the battery pack can also be acquired from the cathode and anode ends. The charging/discharging cycle can be repeated 300 times to provide the battery pack's capacity after 300 cycles. The battery packs' capacity retention rates after 300 cycles are shown in Table 4. The capacity retention rate can be calculated using the following equation:

Capacity retention rate=(capacity after 300 cycles/
initial capacity)×100%.

TABLE 4

CAPACITY RETENTION PERFORMANCE OF BATTERY PACKS E1-E7 AND F1-F2.

| | | Charging Voltage | | | | Discharging Voltage | | | |
| | | Initial Cycle | | 300 Cycles | | Initial Cycle | | 300 Cycles | |
| No. | Capacity Retention (%) | Pack Voltage (V) | Single Voltage (V) | Pack Voltage (V) | Single Voltage (V) | Pack Voltage (V) | Single Voltage (V) | Pack Voltage (V) | Single Voltage (V) |
| --- | --- | --- | --- | --- | --- | --- | --- | --- | --- |
| E1 | 97.3 | 11.410 | 3.807 | 11.410 | 3.803 | 6.010 | 2.012 | 6.003 | 2.005 |
| | | | 3.797 | | 3.803 | | 2.003 | | 2.007 |
| | | | 3.806 | | 3.804 | | 1.995 | | 1.991 |
| E2 | 96.6 | 11.410 | 3.807 | 11.414 | 3.806 | 6.007 | 1.993 | 6.010 | 1.998 |
| | | | 3.802 | | 3.800 | | 2.006 | | 2.012 |
| | | | 3.801 | | 3.808 | | 2.008 | | 2.000 |
| E3 | 96.5 | 11.413 | 3.800 | 11.415 | 3.806 | 6.001 | 2.000 | 6.009 | 2.005 |
| | | | 3.809 | | 3.810 | | 2.003 | | 2.005 |
| | | | 3.804 | | 3.799 | | 1.998 | | 1.999 |
| E4 | 97.5 | 11.401 | 3.799 | 11.411 | 3.801 | 6.003 | 2.006 | 5.998 | 2.006 |
| | | | 3.801 | | 3.807 | | 1.995 | | 1.997 |
| | | | 3.801 | | 3.803 | | 2.002 | | 1.995 |
| E5 | 97.8 | 11.409 | 3.806 | 11.410 | 3.805 | 6.000 | 1.998 | 6.006 | 1.998 |
| | | | 3.805 | | 3.799 | | 2.001 | | 2.003 |
| | | | 3.798 | | 3.806 | | 2.001 | | 2.005 |
| E6 | 98.0 | 11.408 | 3.802 | 11.411 | 3.806 | 6.006 | 1.996 | 6.008 | 1.992 |
| | | | 3.799 | | 3.801 | | 2.010 | | 2.110 |
| | | | 3.807 | | 3.804 | | 2.000 | | 2.106 |
| E7 | 98.3 | 11.407 | 3.807 | 11.409 | 3.804 | 6.005 | 2.005 | 6.000 | 2.007 |
| | | | 3.797 | | 3.799 | | 2.002 | | 1.998 |
| | | | 3.803 | | 3.805 | | 1.998 | | 1.995 |
| F1 | 94.3 | 11.427 | 3.814 | 12.251 | 4.077 | 6.028 | 1.992 | 5.991 | 0.280 |
| | | | 3.805 | | 4.077 | | 2.021 | | 2.855 |
| | | | 3.808 | | 4.097 | | 2.015 | | 2.856 |
| F2 | 85.7 | 11.425 | 3.810 | 12.011 | 3.622 | 5.989 | 2.006 | 6.012 | 2.180 |
| | | | 3.803 | | 4.145 | | 1.981 | | 1.309 |
| | | | 3.812 | | 4.244 | | 2.002 | | 2.523 |

Based on the results of Table 1, batteries containing the electrolyte embodiments of the present invention did not explode when overcharged, and exhibited excellent cycling (charging/discharging) performance. And based on the results of Tables 2 and 3, the batteries exhibited enhanced low temperature discharge capacities and high temperature storage properties. Last but not least, based on the results of Table 4, battery packs containing single batteries incorporating the electrolyte embodiments of the present invention exhibited minimal voltage changes or differences.

Lithium secondary batteries containing the non-aqueous electrolyte embodiments of the present invention are capable of delivering enhanced overcharging and cycling (charging/discharging) characteristics, improved low temperature discharge and high temperature storage properties, and added safety performance when provided in battery packs.

Although the invention has been described in detail with reference to several embodiments, additional variations and modifications exist within the scope and spirit of the invention as described and defined in the following claims.

What is claimed is:

1. An electrolyte for lithium-ion batteries, the electrolyte comprising:
   a lithium salt;
   a non-aqueous solvent; and
   an additive, the additive including three members selected from each of substances A, B and C, wherein:
   substance A includes one or more fused ring compounds and fused heterocyclic compounds;
   substance B includes an alkoxy aromatic compound;
   substance C includes halogenated borane-based salt; and
   a weight ratio of substances A:B:C ranges from about 1:0.05:0.05 to about 1:15:15.

2. The electrolyte of claim 1, wherein weight ratio of the fused ring compounds to the fused heterocyclic compounds of substance A can range from about 1:5 to about 10:1.

3. The electrolyte of claim 1, wherein the fused ring compounds of substance A include one or more members selected from chemical structures (1) and (2), and the fused heterocyclic compounds of substance A include one or more members selected from chemical structures (3), (4) and (5); and

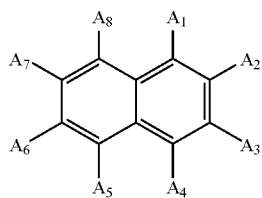

(1)

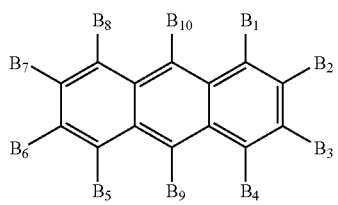

(2)

-continued

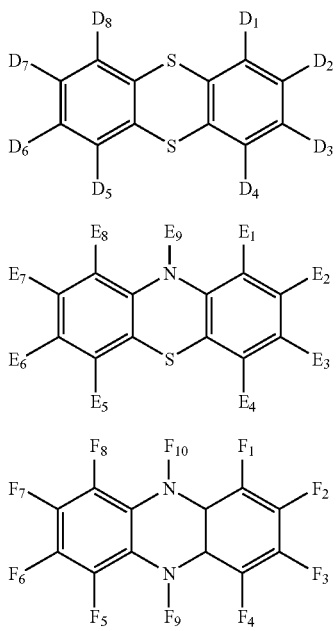

(3)

(4)

(5)

wherein $A_1$-$A_8$, $B_1$-$B_{10}$, $D_1$-$D_8$, $E_1$-$E_9$ and $F_1$-$F_{10}$ can be selected from members consisting of hydrogen, halogens, alkyl groups having 1-20 carbons and acyl groups having 1-15 carbons.

4. The electrolyte of claim 1, wherein the alkoxy aromatic compounds of substance B include one or more members selected from chemical structures (6), (7) and (8); and

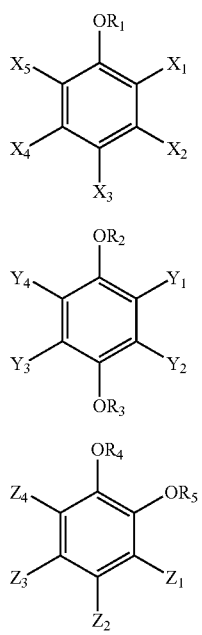

(6)

(7)

(8)

wherein $R_1$-$R_5$ can be selected from members consisting of alkyl groups having 1-15 carbons, and $X_1$-$X_5$, $Y_1$-$Y_4$ and $Z_1$-$Z_4$ can be selected from members consisting of hydrogen, halogens, and alkyl groups having 1-15 carbons.

5. The electrolyte of claim 1, wherein the halogenated borane-based salt includes $Li_2B_{12}F_mH_{12-m}$, wherein $12 \leq m \leq 1$.

6. The electrolyte of claim 1, wherein the amount of additive can be about 1 to 20% of the electrolyte by weight.

7. The electrolyte of claim 1, wherein the lithium salt includes one or more members of lithium hexafluorophosphate, lithium tetrafluoroborate, lithium hexafluoroarsenate, lithium perchlorate, lithium trifluoromethylsulfonate, lithium perfluorobutane sulfonate, lithium aluminate, lithium chloroaluminate, fluorinated lithium sulfonimide, lithium chloride and lithium iodide.

8. The electrolyte of claim 1, wherein the non-aqueous solvent include one or more members of gamma-butyrolactone, methyl ethyl carbonate, methyl propyl carbonate, dipropyl carbonate, anhydride, N-methyl pyrrolidone, N-dimethylformamide, N-methyl acetamide, acetonitrile, N,N-dimethylformamide, sulfolane, dimethyl sulfoxide, diethyl sulfite, and other unsaturated cyclic organic esters having fluorine and sulfur.

9. A lithium-ion battery comprising the electrolyte of claim 1.

10. A battery pack comprising a plurality of single lithium-ion batteries coupled in series or parallel, each lithium-ion battery comprising the electrolyte of claim 1.

11. An electrolyte for lithium-ion batteries, the electrolyte comprising:
a lithium salt;
a non-aqueous solvent; and
an additive, the additive including three members selected from each of substances A, B and C, wherein:
substance A includes one or more fused ring compounds and fused heterocyclic compounds, wherein the fused ring compounds include one or more members selected from chemical structures (1) and (2) and the fused heterocyclic compounds include one or more members selected from chemical structures (3), (4) and (5); and

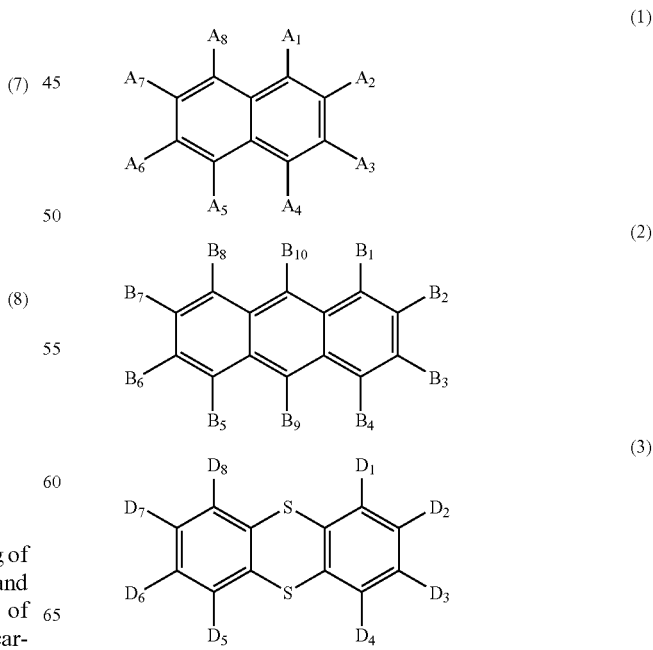

(1)

(2)

(3)

-continued

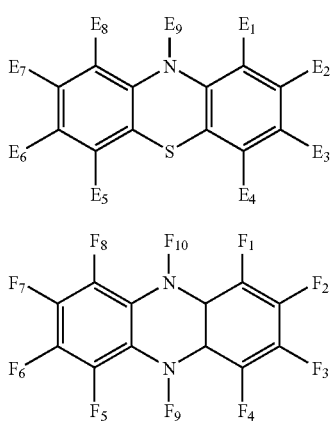

(4)

(5)

wherein $A_1$-$A_8$, $B_1$-$B_{10}$, $D_1$-$D_8$, $E_1$-$E_9$ and $F_1$-$F_{10}$ can be selected from members consisting of hydrogen, halogens, alkyl groups having 1-20 carbons and acyl groups having 1-15 carbons;

substance B includes an alkoxy aromatic compound, wherein the alkoxy aromatic compound includes one or more members selected from chemical structures (6), (7) and (8); and

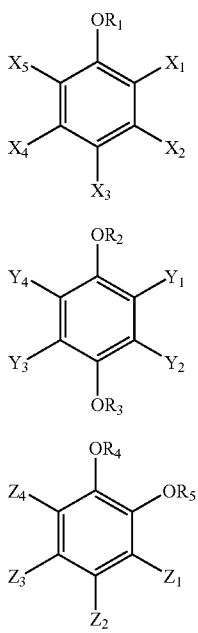

(6)

(7)

(8)

wherein $R_1$-$R_5$ can be selected from members consisting of alkyl groups having 1-15 carbons, and $X_1$-$X_5$, $Y_1$-$Y_4$ and $Z_1$-$Z_4$ can be selected from members consisting of hydrogen, halogens, and alkyl groups having 1-15 carbons;

substance C includes halogenated borane-based salt, wherein the borane-based salt includes $Li_2B_{12}F_mH_{12-m}$, wherein $12 \leq m \leq 1$; and a weight ratio of substances A:B:C ranges from about 1:0.05:0.05 to about 1:15:15.

12. The electrolyte of claim 11, wherein weight ratio of the fused ring compounds to the fused heterocyclic compounds of substance A can range from about 1:5 to about 10:1.

13. The electrolyte of claim 11, wherein the amount of additive can be about 1 to 20% of the electrolyte by weight.

14. A lithium-ion battery comprising the electrolyte of claim 11.

15. A battery pack comprising a plurality of single lithium-ion batteries coupled in series or parallel, each lithium-ion battery comprising the electrolyte of claim 11.

16. An electrolyte for lithium-ion batteries, the electrolyte comprising:

a lithium salt selected from one or more members consisting of lithium hexafluorophosphate, lithium tetrafluoroborate, lithium hexafluoroarsenate, lithium perchlorate, lithium trifluoromethylsulfonate, lithium perfluorobutane sulfonate, lithium aluminate, lithium chloroaluminate, fluorinated lithium sulfonimide, lithium chloride and lithium iodide;

a non-aqueous solvent selected from one or more members consisting of gamma-butyrolactone, methyl ethyl carbonate, methyl propyl carbonate, dipropyl carbonate, anhydride, N-methyl pyrrolidone, N-dimethylformamide, N-methyl acetamide, acetonitrile, N,N-dimethylformamide, sulfolane, dimethyl sulfoxide, diethyl sulfite, and other unsaturated cyclic organic esters having fluorine and sulfur; and an additive being about 1 to 20% of the electrolyte by weight, the additive including three members selected from each of substances A, B and C, wherein:

substance A includes one or more fused ring compounds and fused heterocyclic compounds, wherein the fused ring compounds include one or more members selected from chemical structures (1) and (2) and the fused heterocyclic compounds include one or more members selected from chemical structures (3), (4) and (5); and

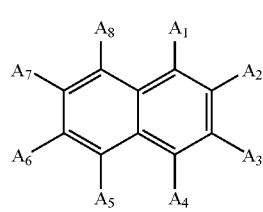

(1)

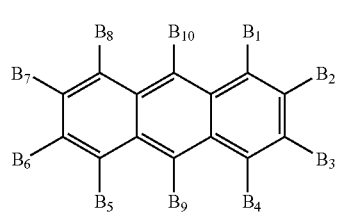

(2)

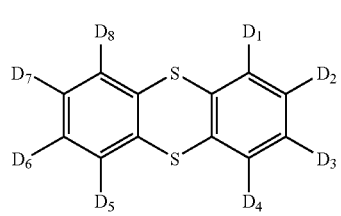

(3)

-continued

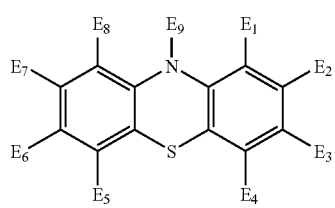
(4)

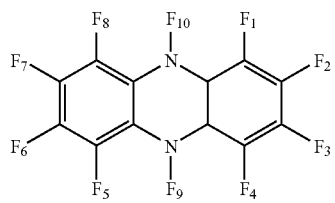
(5)

wherein $A_1$-$A_8$, $B_1$-$B_{10}$, $D_1$-$D_8$, $E_1$-$E_9$ and $F_1$-$F_{10}$ can be selected from members consisting of hydrogen, halogens, alkyl groups having 1-20 carbons and acyl groups having 1-15 carbons;

substance B includes an alkoxy aromatic compound, wherein the alkoxy aromatic compound includes one or more members selected from chemical structures (6), (7) and (8); and

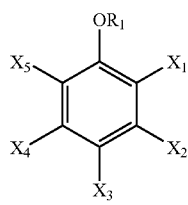
(6)

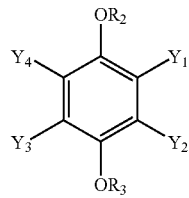
(7)

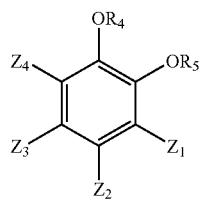
(8)

wherein $R_1$-$R_5$ can be selected from members consisting of alkyl groups having 1-15 carbons, and $X_1$-$X_5$, $Y_1$-$Y_4$ and $Z_1$-$Z_4$ can be selected from members consisting of hydrogen, halogens, and alkyl groups having 1-15 carbons;

substance C includes halogenated borane-based salt, wherein the borane-based salt includes $Li_2B_{12}F_mH_{12-m}$, wherein $12 \leq m \leq 1$; and a weight ratio of substances A:B:C ranges from about 1:0.05:0.05 to about 1:15:15.

* * * * *